July 7, 1936. A. R. THOMPSON 2,046,537
PRODUCT FOR COATING FRUIT AND METHOD OF PREPARING THE SAME
Filed July 5, 1932
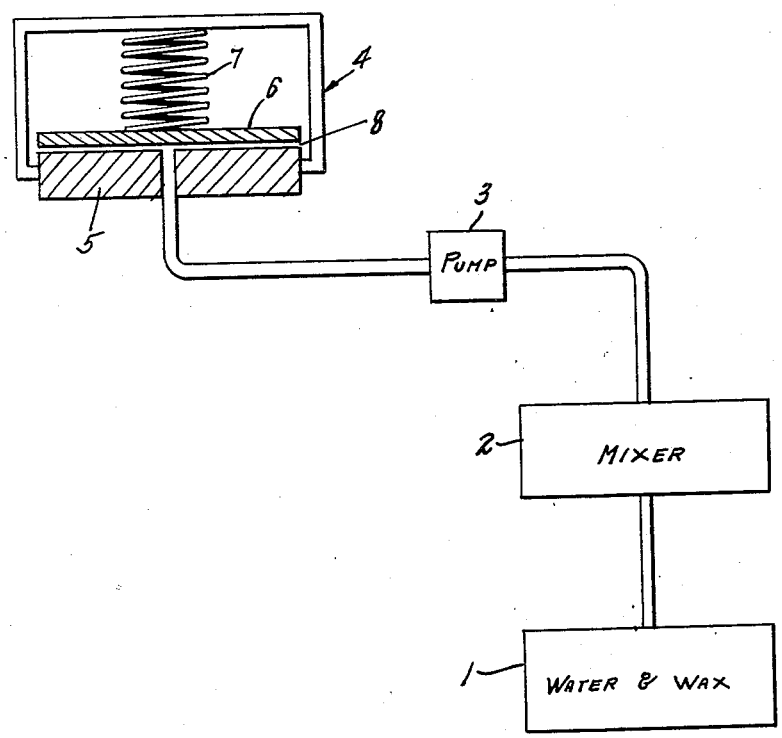
Inventor
Albert R. Thompson
By Lyon & Lyon
Attorneys Patented July 7, 1936

2,046,537

UNITED STATES PATENT OFFICE 2,046,537

PRODUCT FOR COATING FRUIT AND METHOD OF PREPARING THE SAME

Albert R. Thompson, San Jose, Calif., assignor to Food Machinery Corporation, San Jose, Calif., a corporation of Delaware Application July 5, 1932, Serial No. 620,857

3 Claims. (Cl. 99—168)

This invention relates to a product for the treating or coating of fruit or similar articles, and to the method by which such product is prepared. Fruit is now treated extensively with wax, to apply to the surface of the fruit a thin coating of the wax. Many different methods are employed for the applying of a thin coating of wax to the surface of fruit, vegetables, or the like, including the application to the surface of the fruit of wax in slab form, or the wax is melted and the heated wax is sprayed onto the fruit.

Many attempts have been made to obtain a mixture of water and wax which might be utilized for the purpose of coating the fruit so that the wax might be applied to the fruit in a cold condition and effectively. In order to accomplish the application of the wax to the coating of the fruit, it has been suggested that the wax might be saponified in water to condition the wax so that it might be applied cold.

All of the methods now in use have difficulty either in their use or in their application, which it has been long recognized might be overcome by the proper emulsification of the wax with the water. The use of cold slab wax is unsatisfactory for the reason that only a small portion of the wax which is actually utilized is applied to the fruit.

The use of the heated wax which is sprayed onto the fruit is satisfactory except that the method of application and the equipment required for its application is expensive, and because of the liability of injuring the fruit by the heated wax. The saponification of wax and water results, of course, in changing the chemical composition of the wax, which is not desirable. The use of volatile solvents which are added to wax to reduce its consistency results in the injury of the fruit by the volatilization of the solvent.

The addition of emulsifying agents to water and wax has proved unsatisfactory because of the injurious character of the emulsifying agents. It is therefore an object of this invention to provide a product consisting of wax and water in which the wax is so subdivided as to remain indefinitely in suspension within the water without the use of emulsifying agents or without chemical change.

Another object of this invention is to provide a method for the preparation of a wax and water emulsion wherein the wax and water are heated, mixed, and then passed through a mechanical homogenizer.

Another object of this invention is to provide a product for the treatment of fruit, vegetables or the like which includes a homogenized wax and water.

Other objects and advantages of this invention it is believed will be apparent from the following detailed description and as illustrated in the accompanying drawing which diagrammatically illustrates the apparatus utilized for the preparation of the product and carrying out the method embodying my invention.

I have discovered that a mechanical mixture or suspension of wax in water can be prepared which is effective for the coating of fruit, vegetables or like articles, which mechanical suspension or emulsion of wax in water is of a permanent character if the wax and water are first prepared as an emulsion at a temperature above the melting point of the wax and that the mechanical mixture or colloidal mixture of the wax in the water will remain permanent on solidification of the wax if the state of subdivision of the wax in the original emulsion at the temperature above the melting point of the wax is sufficiently minute.

I have also discovered that the original emulsion of the liquid wax in the water may be prepared to this state of subdivision if the mixture of wax and water is passed through a homogenizer so that the particles of subsequently solid wax in water are of colloidal fineness.

In carrying out my invention as diagrammatically illustrated in the accompanying drawing, the water and wax are first placed in a container 1 where the wax is maintained above its melting point. The mixture of wax and water is then passed to a mixer 2 where it is mechanically mixed. From the mixer 2 the mixture of wax and water is passed through a pump 3 by which it is forced under high pressure to a homogenizer 4. The homogenizer 4 consists of a plate or perforated member 5 over which a disc or valve member 6 is held by means of the spring 7 so that the mixture of wax and water is passed under high pressure through the extremely fine orifice passage 8 between the members 5 and 6. The pressure applied to the mixture of water and wax is, under ordinary operation, in the neighborhood of 4,000 lbs. to the square inch. The action is such that the mixture of wax and water is passed through the homogenizer at a temperature above the melting point of the wax so that there is first prepared an emulsion in an extremely fine state of subdivision of wax in water, and on the subsequent cooling of the mixture a colloidal suspension results which is of a permanent character.

After the mixture is prepared, the fruit may be treated by dipping the fruit in this colloidal mixture of wax and water, or by spraying the colloidal mixture of wax and water on the fruit or in any other well known manner.

The colloidal suspension of wax and water is preferably first prepared by mixing in the container 1 four or five parts of water to one part of paraffin wax or other similar wax. The colloidal mixture thus prepared in most cases carries more wax than is required for the coating of the fruit, and it may be subsequently diluted at its place of use in a manner to meet the conditions required.

It is possible, prior to the making of the colloidal suspension of wax in water to add to the wax any of the well known mould retardant agents such, for example, as hydroxyquinoline as set forth in the copending application of Jagan N. Sharma, Serial No. 592,652, filed February 12, 1932.

Having fully described my invention, it is to be understood that I do not wish to be limited to the details herein set forth, but my invention is of the full scope of the appended claims.

I claim:

1. A method of preparing a coating material which is stable at ordinary atmospheric temperatures comprising the steps of mixing water and wax together at a temperature above the melting point of the wax, then homogenizing the mixture by forcing the same under pressure through a restricted aperture to form an aqueous suspension of finely divided particles of wax and then allowing the same to cool.

2. A method of preparing a stable suspension of wax in water for the treatment of fruit and the like which includes the steps of mixing water and a wax together at a temperature above the melting point of the wax, and then forcing the mixture through a relatively fine aperture under a relatively high pressure to homogenize the wax in the water.

3. A method of preparing a concentrated stable suspension of wax in water for the treatment of fruit and the like when diluted, which includes the steps of mixing water and a wax together at a temperature above the melting point of the wax, and then forcing the mixture through a relatively fine aperture under a relatively high pressure to homogenize the wax in the water so it will remain in permanent suspension in any degree of dilution.

ALBERT R. THOMPSON.